United States Patent [19]
Li et al.

[11] Patent Number: 5,744,243
[45] Date of Patent: Apr. 28, 1998

[54] COATING COMPOSITION AND ARTICLES PREPARED THEREWITH

[75] Inventors: Huawen Li, Delmont, Pa.; Alan E. Wang, Hoffman Estates, Ill.; Suryya K. Das, Pittsburgh, Pa.

[73] Assignee: PPG Industries, Inc., Pittsburgh, Pa.

[21] Appl. No.: 709,799

[22] Filed: Sep. 10, 1996

Related U.S. Application Data

[62] Division of Ser. No. 408,438, Mar. 22, 1995, Pat. No. 5,580,819.

[51] Int. Cl.$^6$ ............................................. B32B 9/04
[52] U.S. Cl. .......................... 428/447; 428/451; 525/100; 525/105
[58] Field of Search .................................. 525/100, 105, 525/479; 428/447, 451

[56] References Cited

U.S. PATENT DOCUMENTS

| | | | |
|---|---|---|---|
| 2,466,119 | 4/1949 | Moulton et al. | 88/1 |
| 3,971,872 | 7/1976 | LeBoeuf | 428/412 |
| 4,348,462 | 9/1982 | Chung | 428/412 |
| 4,485,130 | 11/1984 | Lampin | 427/387 |
| 4,753,827 | 6/1988 | Yoldas et al. | 427/387 |
| 4,904,525 | 2/1990 | Taniguchi et al. | 428/328 |
| 4,929,278 | 5/1990 | Ashley et al. | 106/287.12 |
| 5,104,692 | 4/1992 | Belmares | 427/164 |
| 5,115,023 | 5/1992 | Basil | 525/103 |
| 5,116,644 | 5/1992 | Asai et al. | 427/164 |
| 5,120,811 | 6/1992 | Glotfelter | 528/25 |
| 5,198,267 | 3/1993 | Aharoni et al. | 427/162 |
| 5,330,686 | 7/1994 | Smith et al. | 252/586 |
| 5,385,975 | 1/1995 | Nakamura et al. | 525/105 |

FOREIGN PATENT DOCUMENTS

| | | |
|---|---|---|
| 5-271549 | 10/1993 | Japan . |
| 92/16183 | 1/1992 | WIPO . |

OTHER PUBLICATIONS

S. E. Friberg et al., "A poly(methyl methacrylate)/silica combination material", Journal of Materials Science Letters (20) 1992.

A. J. Reedy, "Abrasion–resistant elements", Research disclosures, 17139, (1978).

I. Kaetsu et al, "New Coating Materials and Their Preparation by Radiation Polymerization. III. Antifogging Coating Composition" Journal of Applied Polymer Science, vol. 24, 234–247 (1979).

K. H. Guenther, "Thin film coating technology for ophthalmic lenses", SPIE, vol. 602, Ophthalmic Optics, (1985), pp. 76–87.

*Primary Examiner*—Melvyn I. Marquis
*Attorney, Agent, or Firm*—Frank P. Mallak; Irwin M. Stein

[57] ABSTRACT

Describes a composition for producing durable coatings and a process for preparing a single-layer broad band antireflective coating on solid substrates, such as glass, ceramics, metals, and organic polymeric materials. The coating composition comprises, in combination, acid catalyzed hydrolysis and condensation products of water-silane monomer mixture and a film forming amount of a polymer having functional groups selected from amino, hydroxy and carboxy, hydroxy and amino, amino and carboxy, and amino, hydroxy and carboxy. The described process comprises applying the aforesaid coating composition (or an acid catalyzed sol-gel coating composition) substantially free of preformed oxide sol and water soluble metal salt to the surface of a solid substrate, curing the applied coating, and treating the cured coating with an aqueous electrolyte solution for a time sufficient to produce a coating having graded porosity which is antireflective over a broad band of the visible spectrum.

15 Claims, No Drawings

COATING COMPOSITION AND ARTICLES PREPARED THEREWITH

This is a division of application Ser. No. 08/408,438, filed on Mar. 22, 1995, U.S. Pat. No. 5,580,819.

DESCRIPTION OF THE INVENTION

The present invention relates to compositions for producing durable coatings. More particularly, the present invention relates to a novel process for preparing a single-layer, broad band antireflective coating on solid substrates such as glass, ceramics, metals, and organic polymeric materials. Still more particularly, this invention relates to solid articles having on at least one surface thereof a durable coating of the present invention, or an antireflective coating formed by the process of the present invention.

It is known that the surfaces of solid substrates that have been subjected to treatments or machining to provide a polish, gloss, or another surface aspect, as required by technical or decorative requirements, must be protected by suitable coatings to prevent any alteration of the surface condition. Such protection is more necessary when the surface is more fragile or subject to the risks of alteration or degradation as in the case of, for example, glass, ceramics, and organic polymeric materials which may be scratched or opacified from the effects of friction, abrasion, or even shock. The use of protective coatings based on organoalkoxysilanes, organoalkoxysilane-metal oxide sol-gel compositions, and combinations of acid hydrolyzed silicate, acid hydrolyzed epoxy/silane coupling agent, difunctional monomer, and photoinitiator are disclosed respectively in U.S. Pat. Nos. 4,485,130; 4,753,827; and 5,120,811.

It is also known that it is desirable to reduce reflection on reflective surfaces such as optical articles or elements, e.g., windows, ophthalmic lenses, transparent sheets, films, display surfaces, and the like. The amount of reflected light from such surfaces can be reduced by means of an antireflective coating. The advantages of such coatings, as reported by K. H. Guenther in *Thin Film Coating Technology for Ophthalmic Lenses*, SPIE, 601, Ophthalmic Optics, 1985, pages 76–87, are the elimination of ghost images due to multiple internal reflections, and of disturbing reflection to the wearer and the external viewer. As a consequence, the wearer not only sees better, but also looks better.

The use of a single layer to form antireflective coatings to reduce reflection losses and increase the light transmission of optical glass and optical plastic articles is described in U.S. Pat. Nos. 4,929,278 and 5,116,644. U.S. Pat. No. 4,929,278 describes a sol-gel antireflective surface coating solution and a method for its preparation. The antireflective coating solution is prepared by subjecting a solution of silicon alkoxide and/or metal alkoxide to hydrolysis and condensation in a reaction system containing water and catalyst in an alcohol solution, aging the reaction system to form a sol-gel hydrolyzation-condensation polymeric reaction product, reliquifying the resulting gel and diluting the reliquified sol-gel reaction product to produce the surface coating solution. U.S. Pat. No. 5,116,644 describes an antireflective layer formed by coating a lens with a siloxane-containing hard coat solution having at least one oxide sol, hardening the coated solution to give a hard coat layer, and immersing the lens into an acidic or alkaline solution to dissolve the oxide particles contained in the hard coat layer so as to make the layer non-uniform.

Antireflective coatings formed by the dissolution of coating components using various acids and bases may undergo further dissolution during use of the coated article if it is exposed to acid rain or alkaline cleaning agents. Formation of antireflective coatings using vacuum deposition techniques requires costly equipment and precise control to meet exacting specifications. Consequently, there is a need for a cost effective process to produce durable, antireflective coatings.

It has now been discovered that incorporating a polymer having certain functional groups in a sol-gel type coating composition, i.e., a coating composition comprising the hydrolysis and condensation reaction products of silane monomer(s), acid catalyst and water, results in a durable, i.e., resistant to abrasion, coating. Treatment of such coating (or an acid catalyzed sol-gel coating alone) substantially free of preformed oxide sol, e.g., colloidal silica, colloidal antimony oxide and the like, and preformed water soluble metal salt with the novel process of the present invention produces a single-layer, durable, transparent and adherent antireflective coating.

In accordance with the present invention, a film forming amount of a polymer having amino, hydroxy and carboxy, hydroxy and amino, amino and carboxy, or amino, hydroxy and carboxy functionality is included in the coating composition. Such polymer may be prepared from monomer(s) having at least one functional group selected from hydroxy, amino and/or carboxy groups. The polymer is compatible with the silane monomer, the hydrolysis and condensation reaction products of the silane monomer including by-product alcohol of the coating composition. This coating composition may be used to produce a single-layer, sol-gel, i.e., solution-gelation, durable, i.e., resistant to abrasion, adherent, cured coating on surfaces of solid substrates using conventional coating technology. Moreover, the resultant coating may be treated in accordance with the novel process of the present invention to form an antireflective coating.

The novel process of the present invention comprises applying the aforesaid novel coating composition, or an acid catalyzed sol-gel coating composition, that is substantially free of preformed oxide sol and water-soluble metal salt to the surface of a solid substrate, curing the applied coating composition, and treating the cured coating with an aqueous electrolyte solution for a time sufficient to produce a coating having a graded porosity that is antireflective over a broad range of the visible spectrum, i.e., 400 nanometers to 700 nanometers.

DETAILED DESCRIPTION OF THE INVENTION

The coating composition of the present invention is of the type comprising, in combination, the acid catalyzed hydrolysis and condensation products of a water-silane monomer(s) mixture and a film forming amount of a polymer, i.e., homopolymer, copolymer, terpolymer, etc., having amino, hydroxy and carboxy, hydroxy and amino, amino and carboxy, or amino, hydroxy and carboxy functional group(s). Such polymer may be prepared from monomer(s) having at least one functional group selected from hydroxy, amino and/or carboxy groups.

Monomers that may be used to prepare the aforedescribed polymer include: hydroxy($C_2$–$C_4$)alkyl acrylates, hydroxy ($C_2$–$C_4$)alkyl methacrylates, acrylic acid, methacrylic acid, carboxy($C_1$–$C_4$)alkyl acrylates, carboxy ($C_1$–$C_4$)alkyl methacrylates, amino substituted phenyl acrylates, amino substituted phenyl methacrylates, amino substituted phenyl ($C_1$–$C_9$)alkyl acrylates, amino substituted phenyl($C_1$–$C_9$) alkyl methacrylates, amino substituted phenoxy acrylates, amino substituted phenoxy methacrylates, amino substituted phenoxy($C_1$–$C_9$)alkyl acrylates, amino substituted phenoxy ($C_1$–$C_9$)alkyl methacrylates, amino($C_1$–$C_9$)alkyl acrylates, amino($C_1$–$C_9$)alkyl methacrylates, and vinylamines. The amino substituted phenyl and phenoxy groups may have in addition to the amino substituent(s), further substituents selected from the group consisting of $C_1$–$C_9$ alkyl, cyano, chloro, bromo, methoxy, nitro and methylthio. The total number of substituents on either the phenyl or phenoxy group may range from 1 to 5. Preferably, the monomers used include hydroxy($C_2$–$C_4$)alkyl methacrylates, acrylic acid, methacrylic acid, carboxy($C_1$–$C_4$)alkyl acrylates, amino ($C_1$–$C_9$)alkyl acrylates, and amino($C_1$–$C_9$)alkyl methacrylates.

Examples of hydroxyalkyl acrylates and carboxyalkyl acrylates include 2-hydroxyethyl acrylate, 2-hydroxypropyl acrylate, 3-hydroxypropyl acrylate, 4-hydroxybutyl acrylate, 3,4-dihydroxybutyl acrylate, 2-hydroxyethyl methacrylate, 2-hydroxypropyl methacrylate, 3-hydroxypropyl methacrylate, 4-hydroxybutyl methacrylate, 3,4-dihydroxybutyl methacrylate, carboxymethyl acrylate, 2-carboxyethyl acrylate, 2-carboxypropyl acrylate, 3-carboxypropyl acrylate, 4-carboxybutyl acrylate, carboxymethyl methacrylate, 2-carboxyethyl methacrylate, 2-carboxypropyl methacrylate, 3-carboxypropyl methacrylate, 4-carboxybutyl methacrylate, and the like.

Examples of amino substituted acrylates and methacrylates include the ortho, meta, and para substituted aminophenyl acrylates, amino phenethyl acrylate, amino phenheptyl acrylate, p-aminophenoxy acrylate, 2-(dimethyl amino)ethyl acrylate, 2-(diethylamino)ethyl acrylate, 3-(diethylamino) propyl acrylate, 2-t-butylaminoethyl acrylate, N,N-dibutylaminoethyl acrylate, 2-t-octylaminoethyl acrylate, 7-amino-3,4-dimethyloctyl acrylate, ortho, meta, and para substituted aminophenyl methacrylates, amino phenethyl methacrylate, amino phenheptyl methacrylate, p-aminophenoxy methacrylate, 2-(dimethylamino) ethyl methacrylate, 2-(diethylamino)ethyl methacrylate, 3-(diethylamino)propyl methacrylate, 2-t-butylaminoethyl methacrylate, N,N-dibutyl aminoethyl methacrylate, 2-t-octylaminoethyl methacrylate, 7-amino-3,4-dimethyloctyl methacrylate and the like. Examples of vinylamines include vinylamine, N,N-dimethylvinylamine, N,N-diethylvinylamine, N-methyl-N-phenylvinylamine, N,N-diphenylvinylamine, and the like.

Other polymers having the aforedescribed functional groups that are contemplated for use in the coating composition of the present invention which are not prepared from monomer(s) having such functional used include but are not limited to cellulose ethers, such as sodium carboxymethyl-hydroxy ethyl cellulose, amino deoxycellulose, 2-aminoethyl cellulose, 2-(N',N-diethylamino)ethyl cellulose, aminoethylhydroxypropyl cellulose, and the like.

The polymer incorporated into the coating composition is present in amounts sufficient to form a coating or film in combination with the other components of the coating composition, i.e., a film forming amount, which typically is at a level of from about 1 to about 30 weight percent, based on the total weight of the coating composition, and more particularly, is present in amounts of from about 1 to about 10 weight percent. In order to form a homogeneous and transparent coating composition, the polymer should be compatible, i.e., capable of forming an organic-inorganic composite material with the acid catalyzed hydrolysis and condensation products of the water-silane monomer mixture including by-product alcohol resulting from the hydrolysis and condensation of the silane monomer. The presence of the polymer in the coating composition assists in the formation of a coating having a graded porosity, after the coating is applied to a solid surface, cured, and treated with an aqueous electrolyte solution. The thickness of the coating may range from about 80 nanometers to about 10 microns. Coatings thicker than 10 microns are contemplated; however, such thicker coatings may crack when cured.

The polymer incorporated into the coating composition may contain from about 0 to about 99 weight percent, based on the total weight of the polymer, of moieties resulting from the polymerization of monomers having the aforedescribed functional groups with other monomers substantially free of hydroxy, carboxy and/or amino functional groups to form copolymers, terpolymers, etc. This latter group of monomers include, but are not limited to, $C_1$–$C_{20}$ alkyl acrylates, $C_1$–$C_{20}$ alkyl methacrylates, $C_2$–$C_{20}$ alkenyl acrylates, $C_2$–$C_{20}$ alkenyl methacrylates, $C_5$–$C_8$ cycloalkyl acrylates, $C_5$–$C_8$ cycloalkyl methacrylates, phenyl acrylates, phenyl methacrylates, phenyl($C_1$–$C_9$)alkyl acrylates, phenyl ($C_1$–$C_9$)alkyl methacrylates, substituted phenyl ($C_1$–$C_9$) alkyl acrylates, substituted phenyl($C_1$–$C_9$)alkyl methacrylates, phenoxy($C_1$–$C_9$)alkyl acrylates, phenoxy ($C_1$–$C_9$)alkyl methacrylates, substituted phenoxy($C_1$–$C_9$) alkyl acrylates, substituted phenoxy($C_1$–$C_9$)alkyl methacrylates, $C_1$–$C_4$ alkoxy($C_2$–$C_4$)alkyl acrylates, $C_1$–$C_4$ alkoxy ($C_2$–$C_4$)alkyl methacrylates, $C_1$–$C_4$ alkoxy($C_1$–$C_4$) alkoxy($C_2$–$C_4$)alkyl acrylates, $C_1$–$C_4$ alkoxy($C_1$–$C_4$)alkoxy ($C_2$–$C_4$)alkyl methacrylates, $C_2$–$C_4$ oxiranyl acrylates, $C_2$–$C_4$ oxiranyl methacrylates, copolymerizable di-, tri- or tetra- acrylate monomers, copolymerizable di-, tri-, or tetramethacrylate monomers and perfluoroalkylethyl methacrylate monomer mixtures available as ZONYL®TM. A description of such monomers is found in U.S. Pat. No. 5,330,686 in column 2, line 31 to column 4, line 22, which description is incorporated herein by reference.

Examples of such monomers include methyl methacrylate, ethyl methacrylate, propyl methacrylate, isopropyl methacrylate, butyl methacrylate, isobutyl methacrylate, hexyl methacrylate, 2-ethylhexyl methacrylate, nonyl methacrylate, lauryl methacrylate, stearyl methacrylate, isodecyl methacrylate, ethyl acrylate, methyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, isodecyl acrylate, ethylene methacrylate, propylene methacrylate, isopropylene methacrylate, butane methacrylate, isobutylene methacrylate, hexene methacrylate, 2-ethylhexene methacrylate, nonene methacrylate, isodecene methacrylate, ethylene acrylate, propylene acrylate, isopropylene, hexene acrylate, 2-ethylhexene acrylate, nonene acrylate, isodecene acrylate, cyclopentyl methacrylate, 4-methyl cyclohexyl acrylate, benzyl methacrylate, o-bromobenzyl methacrylate, phenyl methacrylate, nonylphenyl methacrylate, benzyl acrylate, o-bromobenzyl phenyl acrylate, nonylphenyl acrylate, phenethyl methacrylate, phenoxy methacrylate, phenylpropyl methacrylate, nonylphenylethyl methacrylate, phenethyl acrylate, phenoxy acrylate, phenylpropyl acrylate, nonylphenylethyl acrylate, 2-ethoxyethoxymethyl acrylate, ethoxyethoxyethyl methacrylate, 2-ethoxyethoxymethyl acrylate, ethoxyethoxyethyl acrylate, glycidyl methacrylate, glycidyl acrylate, 2,3-epoxybutyl methacrylate, 2,3-epoxybutyl acrylate, 3,4-epoxybutyl acrylate, 3,4-epoxybutyl methacrylate, 2,3-epoxypropyl methacrylate, 2,3-epoxypropyl acrylate 2-methoxyethyl methacrylate, 2-ethoxyethyl methacrylate, 2-butoxyethyl methacrylate, 2-methoxyethyl acrylate, 2-ethoxyethyl acrylate, 2-butoxyethyl acrylate, tetrahydrofurfuryl acrylate, tetrahydrofurfuryl methacrylate, ethoxylated bisphenol-A-dimethacrylate, ethylene glycol diacrylate, 1,2-propane diol diacrylate, 1,3-propane diol diacrylate, 1,2-propane diol dimethacrylate, 1,3-propane diol dimethacrylate, 1,4-butane diol diacrylate, 1,3-butane diol dimethacrylate, 1,4-butane diol dimethacrylate, 1,5 pentane diol diacrylate, 2,5-dimethyl-1,6-hexane diol dimethacrylate, diethylene glycol diacrylate, diethylene glycol dimethacrylate, trimethylol propane trimethacrylate, tetraethylene glycol diacrylate, tetraethylene glycol dimethacrylate, dipropylene glycol dimethacrylate, trimethylol propane triacrylate, glycerol triacrylate, glycerol trimethacrylate, pentaerythritol triacrylate, pentaerythritol dimethacrylate, pentaerythritol tetraacrylate, pentaerythritol tetramethacrylate, and the like.

The polymer incorporated into the coating composition may be prepared by conventional solution polymerization techniques that are well known in the art. This polymerization is usually carried out in an organic solvent under reflux conditions with an appropriate initiator having a specific decomposition half-life. The polymer conversion is usually better than 95 percent. Residual monomer in the product can be eliminated by further addition of initiator and longer hold time or both, as necessary. The level of residual monomer can be further reduced if necessary by redox initiators incorporated in the aqueous medium after inversion from a non-aqueous medium in cases where such inversion is possible and acceptable, presence of surface active agents using water soluble initiators, which are commonly inorganic peroxydisulfates.

The film forming polymer will typically have a number average molecular weight of between about 500 and about 1,000,000, preferably between about 1,000 and about 100,000 and most preferably between about 1,500 and about 25,000.

The coating composition also contains from about to about 70 weight percent, preferably, from about 3 to about 55 weight percent, based on the total weight of the coating composition, of at least one silane monomer represented by the following general formula:

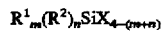   I wherein $R^1$ may be $C_1$–$C_{20}$ alkyl, $C_1$–$C_{20}$ haloalkyl, $C_2$–$C_{20}$ alkenyl, $C_2$–$C_{20}$ haloalkenyl, phenyl, phenyl ($C_1$–$C_{20}$)alkyl, $C_1$–$C_{20}$ alkylphenyl, phenyl($C_2$–$C_{20}$)alkenyl, $C_2$–$C_{20}$ alkenylphenyl, glycidoxy($C_1$–$C_{20}$) alkyl, epoxycyclohexyl ($C_1$–$C_{20}$)alkyl, morpholino, amino($C_1$–$C_{20}$)alkyl, amino ($C_2$–$C_{20}$)alkenyl, mercapto($C_1$–$C_{20}$)alkyl, mercapto ($C_2$–$C_{20}$)alkenyl, cyano($C_1$–$C_{20}$)alkyl, cyano($C_2$–$C_{20}$) alkenyl, acryloxy, methacryloxy, or halogen. The halo or halogen may be bromo, chloro, or fluoro. Preferably, $R^1$ is a $C_1$–$C_{10}$ alkyl, $C_1$–$C_{10}$ haloalkyl, $C_2$–$C_{10}$ alkenyl, phenyl, phenyl ($C_1$–$C_{10}$)alkyl, $C_1$–$C_{10}$ alkylphenyl, glycidoxy ($C_1$–$C_{10}$) alkyl, epoxycyclohexyl($C_1$–$C_{10}$) alkyl, morpholino, amino($C_1$–$C_{10}$) alkyl, amino($C_2$–$C_{10}$) alkenyl, mercapto($C_1$–$C_{10}$)alkyl, mercapto($C_2$–$C_{10}$) alkenyl, cyano ($C_1$–$C_{10}$) alkyl, cyano($C_2$–$C_{10}$)alkenyl, or halogen and the halo or halogen is chloro or fluoro.

In formula I, $R^2$ may be $C_1$–$C_{20}$ alkylene, $C_2$–$C_{20}$ alkenylene, phenylene, $C_1$–$C_{20}$ alkylenephenylene, amino ($C_1$–$C_{20}$)alkylene, amino($C_2$–$C_{20}$) alkenylene; X may be hydrogen, halogen, hydroxy, $C_1$–$C_5$ alkoxy, $C_1$–$C_5$ alkoxy ($C_1$–$C_5$)alkoxy, $C_1$–$C_4$ acyloxy, phenoxy, $C_1$–$C_3$ alkylphenoxy, or $C_1$–$C_3$ alkoxyphenoxy, said halo or halogen being bromo, chloro or fluoro; m and n are each an integer of from 0 to 2; and the sum of m and n is an integer of from 0 to 3. Preferably, $R^2$ is a $C_1$–$C_{10}$ alkylene or $C_2$–$C_{10}$ alkenylene group, phenylene, $C_1$–$C_{10}$ alkylenephenylene, amino($C_1$–$C_{10}$)alkylene, amino($C_2$–$C_{10}$)alkenylene, X is hydrogen, halogen, hydroxy, $C_1$–$C_3$ alkoxy, $C_1$–$C_3$ alkoxy ($C_1$–$C_3$)alkoxy, $C_1$–$C_2$ acyloxy, phenoxy, $C_1$–$C_2$ alkylphenoxy, or $C_1$–$C_2$ alkoxyphenoxy, and the halo or halogen is chloro or fluoro.

Suitable silane monomers include glycidoxymethyltriethoxysilane, alpha-glycidoxyethyl trimethoxysilane, alpha-glycidoxyethyltriethoxysilane, beta-glycidoxyethyltrimethoxysilane, beta-glycidoxyethyltriethoxysilane, alpha-glycidoxypropyltrimethoxysilane, alpha-glycidoxypropyltriethoxysilane, beta-glycidoxypropyltrimethoxysilane, beta-glycidoxypropyltriethoxysilane, gamma-glycidoxypropyltrimethoxysilane, gamma-glycidoxypropylmethyldimethoxysilane, gamma-glycidoxypropyldimethylethoxysilane, methyltrimethoxysilane, methyltriethoxysilane, methyltrimethoxyethoxysilane, methyltriacetoxysilane, methyltripropoxysilane, methyltributoxysilane, ethyltrimethoxysilane, ethyltriethoxysilane, gamma-methacryloxypropyltrimethoxysilane, gamma-aminopropyltrimethoxysilane, gamma-aminopropyltriethoxysilane, gamma-mercaptopropyltrimethoxysilane, chloromethyltrimethoxysilane, chloromethytriethoxysilane, dimethyldiethoxysilane, gamma-chloropropylmethyldimethoxysilane, gamma-chloropropylmethyldiethoxysilane, tetramethylorthosilicate, tetraethylorthosilicate, hydrolyzates of such silane monomers, and mixtures of such silane monomers and hydrolyzates thereof.

The coating composition also contains a catalytic amount of water-soluble acid catalyst. A catalytic amount is that amount which is sufficient to cause polycondensation of the silane monomers and their subsequent cross-linking with the functional group-containing polymer. Typically, the catalytic amount of acid catalyst will range from about 0.01 to about 10.0 weight percent, based on the total weight of the coating composition. The water-soluble acid catalyst may be an organic carboxylic acid or inorganic acid selected from the group consisting of acetic, formic, glutaric, maleic, nitric, sulfuric, and hydrochloric acids. Water is also present in the coating composition in an amount sufficient to form the silane monomer hydrolysis products, the condensation products, and mixtures thereof, and to solubilize the acid catalyst. The sum of all of the components of the coating composition totals 100 weight percent.

The coating composition may further contain from about 0 to about 20 weight percent, based on the total weight of the coating composition, of a compound having the empirical formula:

   II wherein M is a metal selected from the group consisting of titanium, aluminum, zirconium, boron, tin, indium, antimony, and zinc, Y is selected from the group consisting of $C_1$–$C_{10}$ alkoxy and acetylacetonato, and p is an integer equivalent to the valence of M. Preferably, the coating composition contains from about 0 to about 10 weight percent of the compound represented by empirical formula II, wherein M is selected from the group consisting of titanium, aluminum, boron, and zirconium, and Y is $C_1$–$C_5$ alkoxy, e.g., methoxy and ethoxy.

A compatible organic polymer substantially free of hydroxy, amino and carboxy functional groups may also be present in the coating composition in addition to the polymer having the aforedescribed functional groups. This compatible polymer may be present in amounts from about 0.1 to about 15 weight percent, based on the total weight of the coating composition, more preferably in amounts of from about 1 to about 5 weight percent. Suitable organic polymers include polyacrylates, polymethacrylates, poly($C_1$–$C_{12}$) alkyl methacrylates, poly($C_1$–$C_{12}$)alkyl acrylates, polyoxy (alkylene methacrylates), poly(alkoxylated phenol methacrylates), methylcellulose, ethylmethylcellulose, cellulose acetate, cellulose triacetate, cellulose acetate propionate, cellulose acetate butyrate, poly(vinyl acetate), poly(vinyl alcohol), polyesters, polyurethanes, poly(ethylene terephthalate), copoly(styrene-methylmethacrylate), copoly(styrene-acrylonitrile), polyvinyl pyrrolidone, and polyvinylbutyral.

A solvating amount of organic solvent may also be present in the coating composition. A solvating amount is that amount which is sufficient to solubilize the silane monomers in the coating composition. The solvating amount may represent up to about 80 weight percent, based on the total weight of the coating composition. Suitable organic solvents include ethyl acetate, tetrahydrofuran, $C_1$–$C_6$ alkanol , and aliphatic alcohols of the empirical formula:

$$[(R^3)_i R^4](C_1-C_6)OH \qquad \text{III}$$

wherein $R^3$ and $R^4$ are each $C_1$–$C_4$ alkoxy, and i is the integer 0 or 1. Such solvents include methanol, ethanol, 2-ethoxyethanol 2-(2-methoxyethoxy) ethanol, 2-methoxy ethanol, 2-(2-ethoxymethoxy) ethanol, 1-propanol, 2-propanol, and 1-methoxy-2-propanol.

The coating composition may also contain a leveling amount of surfactant. A leveling amount is that amount which is sufficient to allow the coating composition to spread evenly and homogeneously (or to level the coating composition) on the surface of the substrate to which it is applied. Preferably, the surfactant is a liquid at the conditions of use and is used in amounts of from about 0.01 to about 1.0 weight percent, based on the weight of the silane monomer in the coating composition. Suitable surfactants include anionic, cationic, nonionic, and amphoteric surfactants, which are described in the *Kirk Othmer Encyclopedia of Chemical Technology*, Third Edition, Volume 22, pages 332 to 432. Particularly, the anionic surfactants include carboxylic acids and their salts, sulfonic acids and their salts, sulfuric acid esters and their salts, phosphoric and polyphosphoric acid esters and their salts; the nonionic surfactants include ethoxylated alcohols, ethoxylated alkylphenols, ethoxylated carboxylic esters, ethoxylated carboxylic amides, and fluorosurfactants; the cationic surfactants include oxygen-free amines, oxygen-containing amines, amide-linked amines, and quaternary ammonium salts; and the amphoteric surfactants include imidazolinium derivatives, alkyl betaines, and amidopropyl betaines. The nonionic surfactants are preferred.

More particularly, the nonionic surfactant may be selected from the group consisting of ethoxylates of primary, secondary and branched paraffinic alcohols, wherein the alcohol contains from about 6 to 20 carbon atoms and the average number of ethoxy groups range from about 1 to about 20; alkyl phenol ethoxylates and dialkyl phenol ethoxylates, wherein each of the alkyl substituents contains from about 6 to about 12 carbon atoms and the average number of ethoxy groups range from about 1 to about 24; benzyl, propyleneoxy, butyleneoxy, phenoxy and $C_1$–$C_4$ alkoxy capped ($C_6$–$C_{12}$) alkyl phenol ethoxylates, wherein the average number of propyleneoxy or butyleneoxy groups in the molecule may range from 1 to 5; glycerol esters of fatty acids containing from 4 to 22 carbon atoms; ethoxylates and propoxylates of fatty acids wherein the fatty acids contain from 4 to 22 carbon atoms and the average number of ethoxy or propoxy groups is from 1 to 24; sorbitan fatty acid esters wherein the fatty acids contain from 4 to 22 carbon atoms and ethoxylated sorbitan fatty acids esters wherein the average number of ethoxy groups is from about 3 to 20; fatty acid alkanolamides, such as fatty acid diethanoloamides, where the fatty acid contains from 4 to 22 carbon atoms and the alkanolamide contains from 0 to 4 carbon atoms; amine ethoxylates such as tertiary amine ethoxylates, e.g., $R^5N(R')R''$, wherein $R^5$ is a group containing from about 4 to 22 carbon atoms, such as the residue of a fatty acid, and R' and R" are each ethoxy or polyethoxy groups having an average of 1 to 6 ethoxy groups; block copolymers of ethylene oxide and propylene oxide, e.g., ethoxylated polyoxypropylene glycols and propoxylated polyoxyethylene glycols; acetylenic diols and ethoxylated acetylenic diols; fluorosurfactants, i.e., a fluorocarbon containing organic, e.g., alkoxy, or inorganic, e.g., sulfate, surface active and water solubilizing (polar) groups that orient the hydrophilic portion of the surfactant in the aqueous phase; and capped nonionics represented by the formula $R^6(OCH_2CH_2)_s R^7$ wherein $R^6$ is $C_6$ to $C_{20}$ linear or branched alkyl, $R^7$ is selected from halogen, e.g., chloro, fluoro or bromo, benzyl, phenoxy, $C_1$ to $C_4$ alkoxy or —$O(C_dH_{2d}O)_e H$, wherein d is 3 or 4 and e is 1 to 5, and s denotes the average number of ethylene oxide units and is a whole or fractional number ranging from 3 to 20.

Advantageously, the nonionic surfactant is an ethoxylated alkyl phenol, such as the IGEPAL® DM surfactants or octyl phenoxypolyethoxyethanol available as TRITON® X-100), an acetylenic diol such as 2,4,7,9-tetramethyl-5-decyne-4, 7-diol (available as SURFYNOL® 104), ethoxylated acetylenic diols, such as the SURFYNOL® 400 surfactant series, fluorosurfactants, such as the FLUORAD® fluorochemical surfactant series, and capped nonionics such as the benzyl capped octyl phenol ethoxylates (available as TRITON® CF87), the propylene oxide capped alkyl ethoxylates, which are available as the PLURAFAC® RA series of surfactants, and octylphenoxyhexadecylethoxy benzyl ether.

Still more particularly, the nonionic surfactant(s) is selected from the group consisting of ethoxylated alkyl phenols, fluoroaliphatic polymeric esters, such as FLUORAD® FC-430, and fluorinated alkyl polyoxyethylene ethanols, such as FLUORAD® FC-170-C.

The coating composition may also contain from about 0 to about 10 weight percent, based on the total weight of the coating composition, of a fluorinated silane. The fluorinated silane, as used herein may be defined as substances representable by the empirical formula: $F(CF_2)_g CH_2 CH_2 Si(CH_3)_h Z_{3-h}$, wherein Z is chloro, methoxy or ethoxy, g is an integer selected from the integers 1 to 10, and h is the integer 0, 1 or 2.

Examples of such fluorinated silanes include trifluoroacetoxypropyl tri-($C_1$–$C_2$)alkoxysilanes, 3-(heptafluoroisopropoxy)propyltrichlorosilane, 3-(heptafluoroisopropoxy)propyltriethoxysilane, N-(3-triethoxysilylpropyl)perfluorooctanoamide, N-(3triethoxysilylpropyl) perfluoro(2,5-dimethyl-3,6-dioxanonanoyl)amide, (tridecafluoro-1,1,2,2-tetrahydrooctyl)-1dimethylchlorosilane, (tridecafluoro-1,1, 2,2-tetrahydrooctyl)-1-methyldichlorosilane, (tridecafluoro-1,1,2,2-tetrahydrooctyl)-1-trichlorosilane, tridecafluoro-,1, 1,2,2-tetrahydrooctyl-1-triethoxysilane, 3,3,3-trifluoropropyldimethylchlorosilane, (3,3,3-trifluoropropyl)

methydichlorosilane, (3,3,3-trifluoropropyl) methyldimethoxysilane, (3,3,3-trifluoropropyl) methyldimethoxysilane, (3,3,3-trifluoropropyl) trichlorosilane, (3,3,3-trifluoropropyl)trimethoxysilane, 1H,1H,2H,2H-perfluoroalkyltriethoxysilane, 1H,1H,2H,2H-perfluorodecyldimethylchlorosilane, 1H,1H,2H,2H-perfluorodecyldimethylchlorosilane, 1H,1H,2H,2H-perfluorotrichlorosilane, 1H,1H,2H,2H-perfluorotriethoxysilane, 1H,1H,2H,2H-perfluorooctylmethyldichlorosilane, 1H,1H,2H,2H-perfluorooctyltrichlorosilane, and 1H,1H,2H,2H-perfluorooctyltriethoxysilane.

The coating composition of the present invention may be prepared by adding the acid catalyst to a reaction flask containing an aqueous suspension of the selected silane monomer(s). After mixing for about 5 minutes, the selected polymer(s) is added to the reaction flask and the contents are stirred until a clear solution is obtained. Organic solvent and/or surfactant may be added with additional stirring for from about 2 to about 18 hours depending on the acid catalyst used. For example, the use of a strong acid, such as nitric acid, would rapidly catalyze the hydrolysis reaction, whereas the use of a weak acid, such as acetic acid, would take longer. The pH of the coating solution is adjusted to from about 4 to about 5 with a compatible alkaline reagent, such as an aqueous solution of tetramethylammonium hydroxide, if necessary. Prior to use as a coating composition, the mixture is filtered through a suitable filter, such as a Whatman 934-AH filter.

The coating composition of the present invention, or an acid catalyzed sol-gel coating composition, substantially free of preformed oxide sol and preformed water soluble metal salts, i.e., metal salts having a solubility in water of greater than 30 grams per 100 grams of water at 25° C., may be applied to the surface of a host material using any suitable conventional coating method. A coating method such as that described in U.S. Pat. No. 3,971,872 may be used. Conventional coating methods include flow coating, dip coating, spin coating, roll coating, curtain coating and spray coating. Application of the coating is typically done in an environment that is substantially free of dust. The coating may also be applied to a substrate previously coated with an antistatic, conductive, hardcoat, or a similar type of coating.

The acid catalyzed sol-gel coating composition substantially free of preformed oxide sol and preformed water soluble metal salts may include polymerizable organic monomers or polymers that contain or that are free of the aforedescribed hydroxy, amino, and/or carboxy functional groups. If the coating composition is substantially free of the aforementioned monomers and/or polymers, the silane monomer chosen may be selected on the basis of its impact on the time required for the aqueous electrolyte solution treatment of the cured coating to produce a graded porosity. For example, to reduce the treatment time necessary, methyltriethoxy silane may be used in place of methyltrimethoxy silane. an amino containing silane, such as aminopropyltrimethoxy silane, may be added or the amount of certain silanes used, such as gamma glycidoxypropyltrimethoxy silane, may be minimized. Other parameters such as abrasion resistance and percent transmission of the cured antireflective coating may be effected by the selection of the coating composition components. It is expected that one skilled in the art can make modifications to the formulation of the coating composition to obtain the desired characteristics of the cured antireflective coating.

It is typical to treat the surface of the substrate to be coated prior to applying the coating composition for the purposes of cleaning the surface and promoting adhesion. Effective treatment techniques for plastics, such as those prepared from CR39® allyl diglycol carbonate monomer, include ultrasonic cleaning, washing with an aqueous mixture of organic solvent, e.g., a 50:50 mixture of isopropanol:water or ethanol:water; activated gas treatment, e.g., treatment with low temperature plasma or corona discharge, and chemical treatment such as hydroxylation, i.e., etching of the surface with an aqueous solution of alkali, e.g., sodium hydroxide or potassium hydroxide, that may also contain a fluorosurfactant. See U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of organic polymeric materials.

The treatment used for cleaning glass surfaces will depend on the type of dirt present on the glass surface. Such treatments are known to those skilled in the art. For example, washing the glass with an aqueous solution that may contain a low foaming, easily rinsed detergent, followed by rinsing and drying with a lint-free cloth; and ultrasonic bath treatment in heated (about 50° C.) wash water, followed by rinsing and drying. Pre-cleaning with an alcohol-based cleaner or organic solvent prior to washing may be required to remove adhesives from labels or tapes.

Following application of the coating composition to the treated surface of the substrate, the coating is cured by heating it to a temperature of between about 80° C. and a temperature above which the substrate is damaged due to heating, e.g., 80° C. to about 130° C. For example, organic polymeric materials may be heated up to about 130° C. for a period of about 1 to 16 hours in order to cure the coating. While a range of temperatures has been provided for curing the coated substrate, it will be recognized by persons skilled in the art that temperatures other than those disclosed herein may be used. Additional methods for curing the coating composition include irradiating the coating with infrared, ultraviolet, gamma or electron radiation so as to promote the polymerization reaction of the polymerizable components in the coating.

The process of producing an antireflective coating in accordance with the present invention comprises contacting the cured coating with an aqueous electrolyte solution for a time sufficient to produce a coating having graded porosity, i.e., a coating the porosity of which decreases through the thickness of the coating along a path starting at a point on the surface of the coating and proceeding to a point adjacent to the surface of the coated article. The graded porosity causes a reduction of the refractive index of the coating. When the refractive index of the coating is less than or equal to the refractive index of the substrate, more light will pass through the coating and less light will be reflected. A coating with graded porosity will demonstrate a broad band antireflective effect, i.e., reflect light over the entire range of the visible spectrum, i.e., from 400 to 700 nanometers.

More particularly, the cured coating is contacted with an aqueous electrolyte solution of the present invention having a temperature of from about 20° C. to the boiling temperature of the aqueous electrolyte solution, e.g., 100°–103° C., for a time sufficient to produce a coating having a graded porosity. The application of ultrasonic frequencies, e.g., 40 to 50 Khz, to provide consistent cavitation where the cured coating is in contact with the aqueous electrolyte solution during the treatment step may reduce the time necessary to produce an antireflective coating. The treated coating may be contacted subsequently with an aqueous rinsing solution for a time and in a manner sufficient to remove residual products resulting from the treatment step and the coating subsequently dried.

The aqueous electrolyte solution used in the process of the present invention comprises an aqueous solution of hydrogen chloride, tetra($C_1$-$C_{12}$)alkyl ammonium salts, tetra ($C_1$-$C_{12}$)alkyl ammonium hydroxide, metal salts, hydrates of said salts, metal hydroxides, hydrates of said hydroxides or mixtures thereof, having a pH from about 4 to about 12. Preferably, the salt of the tetra($C_1$-$C_{12}$) alkyl ammonium salt or metal salt is selected from the group consisting of carbonate, carboxylate, sulfonate, sulfate, nitrate, perchlorate, phosphate, halide, e.g., fluoride, chloride, bromide, and iodide salts and mixtures of such salts having a pH from about 7 to about 9. Preferably, the metal of the aqueous metal salt solution is an alkaline earth metal or alkali metal. Suitable metals include lithium, sodium, potassium, calcium, barium, magnesium, and strontium.

Examples of aqueous electrolyte solutions include aqueous solutions of tetramethylammonium hydroxide, tetraethylammonium iodide, tetrapropylammonium perchlorate, tetrabutylammonium sulfate, tetrapentylammonium carbonate, tetrahexylammonium chloride, tetraheptylammonium bromide, tetraoctylammonium citrate, tetranonylammonium stearate, tetradecyl ammonium nitrate, tetradecyltrimethylammonium phosphate, tetraundecylammonium sulfonate, tetradodecylammonium fluoride, magnesium hydroxide, lithium hydroxide, sodium hydroxide, potassium hydroxide, calcium hydroxide, barium hydroxide, aluminum hydroxide, sodium iodide, lithium perchlorate, potassium acetate, calcium sulfate, barium citrate, lithium sulfate, sodium sulfonate, lithium nitrate, potassium bromide, stannic chloride, calcium chloride, calcium carbonate, magnesium carbonate, sodium carbonate, barium fluoride, sodium phosphate, calcium stearate, hydrates of such salts, and mixtures of such salts or hydrates thereof.

The concentration of the electrolyte in the aqueous electrolyte solution may vary widely, e.g., from the part per million range found in tap water to saturation levels for slightly soluble salts such as magnesium carbonate. Typically, the concentration of electrolyte will vary from about 0.0001 to about 1.0 weight percent, based on the total weight of the aqueous electrolyte solution.

The substrates to which the coating compositions of the present invention may be applied include: glass, metals, ceramics, and organic polymeric materials. Examples of organic polymeric materials include polymers, i.e., homopolymers and copolymers, of polyol(allyl carbonate) monomers, diethylene glycol dimethacrylate monomers, diisopropenyl benzene monomers, and alkoxylated polyhydric alcohol acrylate monomers, such as ethoxylated trimethylol propane triacrylate monomers, polymers, i.e., homopolymers and copolymers, of polyfunctional, i.e., mono-, di-, tri-, or tetra- functional, acrylate and/or methacrylate monomers, polyacrylates, polymethacrylates, poly ($C_1$-$C_{12}$) alkylacrylates such as a poly(methyl methacrylate), polyoxy (alkylene methacrylates) such as poly(ethylene glycol bis methacrylates), poly(ethoxylated phenol methacrylates), such as poly(ethoxylated bisphenol A dimethacrylates) cellulose acetate, cellulose triacetate, cellulose acetate propionate, cellulose acetate butyrate, poly (vinyl acetate), poly(vinyl alcohol), poly(vinyl chloride), poly(vinylidene chloride), polyurethanes, thermoplastic polycarbonates, polyesters, poly(ethylene terephthalate), polystyrene, copoly(styrene-methyl methacrylates) copoly (styrene-acrylonitrile), polyvinylbutyral and polymers, i.e., homopolymers and copolymers, of diallylidene pentaerythritol, particularly copolymers with polyol(allyl carbonate) monomers, e.g., diethylene glycol bis (allylcarbonate), and acrylate monomers.

Transparent copolymers and blends of transparent polymers are suitable as substrates for optical articles to which the coating composition of the present invention may be applied. Preferably, the substrate is an optically clear polymerized organic material prepared from a thermoplastic polycarbonate resin, such as the carbonate-linked resin derived from bisphenol A and phosgene, which is sold under the trademark LEXAN; a polyester, such as the material sold under the trademark MYLAR; a poly(methyl methacrylate), such as the material sold under the trademark PLEXIGLAS; polymerizates of a polyol(allyl carbonate) monomer, especially diethylene glycol bis(allyl carbonate), which monomer is sold under the trademark CR-39, and polymerizates of copolymers of a polyol (allyl carbonate), e.g., diethylene glycol bis(allyl carbonate), with other copolymerizable monomeric materials, such as copolymers with vinyl acetate, and copolymers with a polyurethane having terminal diacrylate functionality, as described in U.S. Pat. Nos. 4,360,653 and 4,994,208; and copolymers with aliphatic urethanes, the terminal portion of which contain allyl or acrylyl functional groups, as described in U.S. Pat. No. 5,200,483; poly(vinyl acetate), polyvinylbutyral, polyurethane, polymers of members of the group consisting of diethylene glycol dimethacrylate monomers, diisopropenyl benzene monomers, and ethoxylated trimethylol propane triacrylate monomers; cellulose acetate, cellulose propionate, cellulose butyrate, cellulose acetate butyrate, polystyrene and copolymers of styrene with methyl methacrylate, vinyl acetate and acrylonitrile.

The organic polymeric material may be in the form of optical elements such as windows, plano and vision correcting ophthalmic lenses, exterior viewing surfaces of liquid crystal displays, cathode ray tubes e.g., video display tubes for televisions and computers, clear polymeric films, automotive transparencies, e.g., windshields, aircraft transparencies, plastic sheeting, etc. Application of the antireflective coating of the present invention to a polymeric film in the form of an "applique" may be accomplished using the methods described in column 17, line 28 to column 18, line 57 of U.S. Pat. No. 5,198,267.

The present invention is more particularly described in the following examples which are intended as illustrative only, since numerous modifications and variations therein will be apparent to those skilled in the art.

EXAMPLE 1

Step 1

The following materials were added to a suitable reaction vessel equipped with an agitator, a reflux column, a thermocouple, and a heating mantle:

| Material | Weight (grams) |
|---|---|
| Charge 1 | |
| Ethanol[1] | 3272.5 |
| Charge 2 | |
| Acrylic acid | 63 |
| 2-Hydroxyethyl methacrylate | 2318.4 |
| N,N-Dimethylaminoethyl-methacrylate | 277.2 |
| Ethanol | 1050 |
| VAZO ® 67[2] | 133 |

[1]Ethanol used in all of the examples was a technical grade comprising the following identified components listed in weight percentage, based on the total weight of the solvent: ethanol — 84.4%, methanol — 4.4%, methylisobutyl ketone — 0.94%, ethyl acetate — 4.72%, and water — 5.49%, accounting for 99.95% of the solvent.
[2]VAZO ® 67 chemically is 2,2'-azobis-(2-methylbutyronitrile) and is available from E. I. duPont de Nemours and Company.

Charge 1 was initially added to the reaction vessel and heat was applied with agitation until the reflux temperature was reached. Charge 2 was fed into the reaction vessel in a continuous manner over a period of 3 hours. The reflux temperature was maintained throughout the addition of Charge 2. With the completion of the addition of Charge 2, the reaction mixture was held for an additional 3 hours at the reflux temperature. The contents of the reaction vessel were then cooled and transferred to a suitable container. The resulting polymer solution had a total solids content, based on total solution weight, of 40.6 percent and the number average molecular weight of the polymer was calculated to be 10,862.

Step 2

Methyltrimethoxysilane (45 grams), gamma-glycidoxypropyl trimethoxysilane (4.7 grams), tetraethylorthosilicate (15 grams), acetic acid (6 grams), and water (30 grams) were added to a reaction flask. The solution was stirred for 5 minutes. The polymer solution of Step 1 (4 grams) was added to the reaction flask which was stirred until a clear solution was obtained. Ethanol (30 grams) was added and the clear solution was maintained at room temperature for about 18 hours. Afterwards, FLUORAD® FC-430, a fluoroaliphatic polymeric ester surfactant (0.5 grams) was added to the solution and the solution stirred for 30 minutes. The solution was filtered through a Whatman 934-AH filter prior to use as a coating composition.

EXAMPLE 2

Step 1

The procedure of Step 1 of Example 1 was used except for the following changes:

| Material | Weight (grams) |
| --- | --- |
| Charge 1 | |
| Ethanol | 467.5 |
| Charge 2 | |
| 2-Hydroxyethyl methacrylate | 342 |
| N,N-Dimethylaminoethyl-methacrylate | 39.6 |
| Ethanol | 150 |
| VAZO ® 67 | 19.1 |

The resulting polymer solution had a total solids content, based on total solution weight, of 40 percent and the number average molecular weight of the polymer was calculated to be 12,638.

Step 2)

Methyltrimethoxysilane (216 grams), gamma-glycidoxypropyl trimethoxysilane (21.6 grams), tetraethylorthosilicate (72 grams), acetic acid (28.8 grams), and water (144 grams) were added to a reaction flask. The solution was stirred for 5 minutes. The polymer solution of Step 1 (19.2 grams) was added to the reaction flask and the contents stirred until a clear solution was obtained. Ethanol (192 grams) was added and the clear solution was maintained at 30° C. for 4 hours and then at room temperature for about 14 hours. Afterwards, FLUORAD® FC-430, a fluoroaliphatic polymeric ester surfactant (2 grams), was added to the solution and the solution stirred for 30 minutes. The solution was filtered through a Whatman 934-AH filter prior to use as a coating composition.

EXAMPLE 3

Step 1

The procedure of Step 1 of Example 1 was used except for the following changes:

| Material | Weight (grams) |
| --- | --- |
| Charge 1 | |
| Ethanol | 467.5 |
| Charge 2 | |
| Acrylic acid | 19.1 |
| 2-Hydroxyethyl methacrylate | 362.5 |
| Ethanol | 150 |
| VAZO ® 67 | 19.1 |

The resulting polymer solution had a total solids content, based on total solution weight, of 42.8 percent and the number average molecular weight of the polymer was calculated to be 11,762.

Step 2

The procedure of Step 2 of Example 1 was followed except that 4 grams of the polymer solution from Step 1 of Example 3 was used.

EXAMPLE 4

Step 1

The procedure of Step 1 of Example 1 was used except for the following changes:

| Material | Weight (grams) |
| --- | --- |
| Charge 1 | |
| Ethanol | 467.5 |
| Charge 2 | |
| 2-Hydroxyethyl methacrylate | 286.2 |
| N,N-Dimethylaminoethyl-methacrylate | 95.4 |
| Ethanol | 150 |
| VAZO ® 67 | 19.1 |

The resulting polymer solution had a total solids content, based on total solution weight, of 41.9 percent and the number average molecular weight of the polymer was calculated to be 13,941.

Step 2

Methyltrimethoxysilane (54 grams), gamma-glycidoxypropyl trimethoxysilane (5.4 grams), tetraethylorthosilicate (18 grams), acetic acid (7.2 grams), and water (36 grams) were added to a reaction flask. The solution was stirred for 5 minutes. The polymer solution of Step 1 (4.8 grams) was added to the reaction flask, the contents of which were stirred until a clear solution was obtained. Ethanol (48 grams) was added and the clear solution was maintained at room temperature for about 18 hours. Afterwards, FLUORAD® FC-430, a fluoroaliphatic polymeric ester surfactant (0.5 grams) was added to the solution and the solution was stirred for 30 minutes. The solution was filtered through a Whatman 934-AH filter prior to use as a coating composition.

EXAMPLE 5

Step 1

The procedure of Step 1 of Example 1 was used except for the following changes:

| Material | Weight (grams) |
| --- | --- |
| Charge 1 | |
| Ethanol | 467.5 |
| Charge 2 | |
| 2-Hydroxyethyl methacrylate | 190.8 |
| N,N-Dimethylaminoethyl-methacrylate | 190.8 |
| Ethanol | 150 |
| VAZO® 67 | 19.1 |

The resulting polymer solution had a total solids content, based on total solution weight, of 39.7 percent and the number average molecular weight of the polymer was calculated to be 11,939.

Step 2

The procedure of Step 2 of Example 4 was followed except that 4.8 grams of the polymer solution from Step 1 of Example 5 was used.

EXAMPLE 6

Step 1

The procedure of Step 1 of Example 1 was used except for the following changes:

| Material | Weight (grams) |
| --- | --- |
| Charge 1 | |
| Ethanol | 467.5 |
| Charge 2 | |
| N,N-Dimethylaminoethyl-methacrylate | 381.6 |
| Ethanol | 150 |
| VAZO® 67 | 19.1 |

The resulting polymer solution had a total solids content, based on total solution weight, of 37.5 percent and the number average molecular weight of the polymer was calculated to be 5,765.

Step 2

Methyltrimethoxysilane (540 grams), gamma-glycidoxypropyl trimethoxysilane (108 grams), tetraethylorthosilicate (18 grams), acetic acid (72 grams), and water (360 grams) were added to a reaction flask. The solution was stirred for 5 minutes. The polymer solution of Step 1 (480 grams) was added to the reaction flask, the contents of which were stirred until a clear solution was obtained. 1-Propanol (480 grams) was added and the clear solution was maintained at room temperature for about 18 hours. Afterwards, FLUORAD® FC-430, a fluoroaliphatic polymeric ester surfactant (5 grams) was added to the solution and the solution was stirred for 30 minutes. The solution was filtered through a Whatman 934-AH filter prior to use as a coating composition.

EXAMPLE 7

Step 1

The procedure of Step 1 of Example 1 was used except for the following changes:

| Material | Weight (grams) |
| --- | --- |
| Charge 1 | |
| Ethanol | 3272.5 |
| Charge 2 | |
| Acrylic acid | 63 |
| 2-Hydroxyethyl methacrylate | 2608.2 |
| Ethanol | 1050 |
| VAZO® 67 | 133.7 |

The resulting polymer solution had a total solids content, based on total solution weight, of 41.8 percent and the number average molecular weight of the polymer was calculated to be 11,533.

Step 2

Methyltrimethoxysilane (90 grams), gamma-glycidoxypropyl trimethoxysilane (9 grams), tetraethylorthosilicate (30 grams), acetic acid (12 grams), and water (60 grams) were added to a reaction flask. The solution was stirred for 5 minutes. The polymer solution of Step 1 (6 grams) was added to the reaction flask, the contents of which were stirred until a clear solution was obtained. Ethanol (40 grams) was added and the clear solution was maintained at room temperature for about 18 hours. Afterwards, FLUORAD® FC-430, a fluoroaliphatic polymeric ester surfactant (0.5 grams) was added to the solution and the solution was stirred for 30 minutes. The solution was filtered through a Whatman 934-AH filter prior to use as a coating composition.

EXAMPLE 8

Step 1

The procedure of Step 1 of Example 1 was used except for the following changes:

| Material | Weight (grams) |
| --- | --- |
| Charge 1 | |
| Isopropanol (Anhydrous) | 467.5 |
| Charge 2 | |
| Acrylic acid | 9 |
| N,N-Dimethylaminoethyl-methacrylate | 39.6 |
| Methyl methacrylate | 331.2 |
| Isopropanol (Anhydrous) | 150 |
| VAZO® 67 | 19 |

The resulting polymer solution had a total solids content, based on total solution weight, of 39.4 percent and the number average molecular weight of the polymer was calculated to be 5,072.

Step 2

The procedure of Step 2 of Example 1 was followed except that 4 grams of the polymer solution from Step 1 of Example 8 was used.

EXAMPLE 9

Step 1

The procedure of Step 1 of Example 1 was used except for the following changes:

| Material | Weight (grams) |
| --- | --- |
| Charge 1 | |
| Ethanol | 467.5 |
| Charge 2 | |
| Acrylic acid | 9 |
| 2-Hydroxyethyl methacrylate | 287.7 |
| t-Butylaminoethyl methacrylate | 46.7 |
| Methyl methacrylate | 38.2 |
| Ethanol | 150 |
| VAZO ® 67 | 19.1 |

The resulting polymer solution had a total solids content, based on total solution weight, of 40.5 percent and the number average molecular weight of the polymer was calculated to be 8,638.

Step 2

The procedure of Step 2 of Example 4 was followed except that 4.8 grams of the polymer solution from Step 1 of Example 9 was used.

EXAMPLE 10

Step 1

The procedure of Step 1 of Example 1 was used except for the following changes:

| Material | Weight (grams) |
| --- | --- |
| Charge 1 | |
| Ethanol | 467.5 |
| Charge 2 | |
| Acrylic acid | 9 |
| Hydroxyethyl acrylate | 294.8 |
| N,N-Dimethylaminoethyl-methacrylate | 39.6 |
| Methyl methacrylate | 38.2 |
| Ethanol | 150 |
| VAZO ®67 | 19.1 |

The resulting polymer solution had a total solids content, based on total solution weight, of 40.3 percent and the number average molecular weight of the polymer was calculated to be 2,892.

Step 2

The procedure of Step 2 of Example 4 was followed except that 4.8 grams of the polymer solution from Step 1 of Example 10 was used.

EXAMPLE 11

Step 1

The procedure of Step 1 of Example 1 was used except for the following: Charge 2 was added to the reaction flask over a 2 hour period instead of 3 hours; and the following changes to Charge 1 and Charge 2.

| Material | Weight (grams) |
| --- | --- |
| Charge 1 | |
| Methyl ethyl ketone | 133.6 |
| Charge 2 | |
| ZONYL ®TM[3] | 20 |
| 2-Hydroxyethyl methacrylate | 20 |
| N,N-Dimethylaminoethyl-methacrylate | 25 |
| Methyl methacrylate | 35 |
| Methyl ethyl ketone | 20 |
| VAZO ®67 | 2.4 |

[3]ZONYL ®TM chemically is a perfluoroalkylethyl methacrylate monomer mixture and is available from E. I. duPont de Nemours and Company.

The resulting polymer solution had a total solids content, based on total solution weight, of 39.5 percent. In order to recover the polymer in an aqueous solution by inversion, acetic acid (9.6 grams) and water (375 grams) were added to the polymer solution with mixing and the polymer solution was heated to 98° C. and held at that temperature for 3 hours with agitation. The resulting aqueous polymer solution had a total solids content, based on total solution weight, of 24.3 percent.

Step 2

The procedure of Step 2 of Example 4 was followed except that 4.8 grams of the polymer solution from Step 1 of Example 11 was used.

EXAMPLE I

The procedure of Step 2 of Example 2 was followed except that no polymer product was added.

EXAMPLE 12

Part A

Test samples of ⅛ inch (0.3 centimeters) by 2 inches (5.1 centimeters) by 2 inches (5.1 centimeters) square polymerizates prepared from CR-39® diethylene glycol bis(allyl carbonate) monomer were cleaned in an ultrasonic bath filled with an ultrasonic cleaning solution for ten minutes and then soaked in either a 15 weight percent aqueous sodium hydroxide or tetramethyl ammonium hydroxide solution for about 5 minutes at 55° to 60° C. as indicated in Table 1. The ultrasonic cleaner was a Branson B-220 model rated at 50/60 Hz, 117 volts and 1.0 amperes. The ultrasonic cleaning solution was prepared by diluting Fisherbrand Ultrasonic Cleaning Solution Concentrate with water in a ratio of 10:1 (water: concentrate). Afterwards, the test samples were rinsed first with water, secondly with a 50:50 mixture of isopropanol:water, and then dried in a nitrogen gas stream. The coating compositions of Example I and Examples 1 through 11 were applied to the test samples by dip coating. The Coating Solution Age, i.e., the number of days between preparation of the coating composition and coating of the test samples, is listed in Table 1. The withdrawal rate used was approximately 8 to 10 centimeters per minute. Afterwards, the coated test samples were dried and cured in an air-circulating oven for about 3 hours at 120° C. The coated and cured test samples were further treated by immersion in an aqueous electrolyte solution (tap water) containing the following cationic species in the following approximate concentrations: barium (0.04 ppm), calcium (31 ppm), iron (0.03 ppm), magnesium (7 ppm), sodium (8 ppm), silicon (1.8 ppm), strontium (0.12 ppm), zinc (0.02 ppm); and the following anionic species: fluoride (1 ppm), chloride (17 ppm), nitrate (1.7 ppm), and sulfate (81 ppm) maintained at a temperature of approximately 100° C. for the Treatment Time (Minutes) listed in Table 1.

Part B

Abrasion resistance of the coated and cured test samples prepared in Part A was determined using ASTM Test Method F735-81. The test samples were exposed to 300 cycles of oscillation in the ASTM Test Method. The Bayer Abrasion Resistance Index (BARI), listed in Table 1, was calculated by dividing the percent haze of an uncoated test sample made of a homopolymer prepared from CR-39® allyl diglycol carbonate monomer by the percent haze of the untreated (by immersion in the electrolyte solution) coated test sample. The resulting number is an indication of how much more abrasion resistant is the coated test sample compared to the uncoated test sample. The haze and percent luminous transmittance (defined as the ratio of transmitted to incident light multiplied by 100) of coated test samples before and after abrasion testing were measured with a Hunter Lab Model DP25P Colorimeter. Listed in Table 1 are the Percent Transmittance levels before abrasion resistance testing and the highest Percent Transmittance level obtained after treatment with aqueous electrolyte for the Treatment Time indicated.

TABLE 1

| Coating Composition | Coating Solution Age (Days) | Percent Transmittance (Before) | Treatment Time (Minutes) | Percent Transmittance (After) | BARI |
| --- | --- | --- | --- | --- | --- |
| Example 1* | 6 | 94.3 | 20 | 98.0 | 1.7 |
| Example 2 | 49 | 94.8 | 15 | 99.3 | 2.4 |
| Example 3 | 6 | 93.6 | 27 | 96.5 | — |
| Example 4 | 7 | 94.3 | 24 | 96.1 | 2.6 |
| Example 5 | 7 | 94.3 | 24 | 96.2 | 2.6 |
| Example 6 | 7 | 94.0 | 50 | 98.2 | 2.9 |
| Example 7 | 4 | 94.2 | 30 | 98.1 | 1.7 |
| Example 8 | 2 | 94.2 | 31 | 96.6 | — |
| Example 9* | 6 | 94.2 | 50 | 98.3 | 1.5 |
| Example 10* | 6 | 94.4 | 21 | 97.9 | 1.9 |
| Example 11 | 7 | 94.3 | 24 | 96.7 | 2.7 |
| Example I | 8 | 94.1 | 60 | 94.5 | 1.0 |

*Indicates that the substrate to which the coating was applied was first treated with tetramethylammonium hydroxide.
— Indicates that the BARI was not measured The results in Table 1 show that the percent transmittance of the test samples coated with the coating compositions of Examples 1–11 increased at least 1.8 percent after treatment, while the sample coated with the coating composition of Example I increased only 0.4 percent, a larger increase in the percent of transmittance would be attained if the treatment time was lengthened. The BARI results showed that the test samples coated with the coating compositions of Examples 1 through 11 were more resistant to abrasion than the sample coated with Example I.

EXAMPLE 13

The coating composition of Example 2 was prepared except that 24 grams of the polymer solution of Step 1 was used. This coating composition was applied to several of the same type of square polymerizate test samples described in Example 12, Part A, cured, and tested according to the procedures of Part A and Part B of Example 12, except that the coating solution was aged for 7 days and the temperature of the aqueous electrolyte treatment was maintained at the levels listed in Table 2.

TABLE 2

| Treatment Temperature (°C.) | Percent Transmittance (Before) | Treatment Time (Minutes) | Percent Transmittance (After) |
| --- | --- | --- | --- |
| 100 | 93.6 | 11 | 98.2 |
| 90 | 93.5 | 55 | 96.9 |
| 80 | 93.6 | 120 | 98.3 |
| 70 | 93.7 | 400 | 97.7 |
| 60 | 93.6 | 530 | 95.2 |
| 25 | 93.6 | 48 (Days) | 97.3 |

The results of Table 2 demonstrate the inverse relationship that exists between Treatment Temperature and Treatment Time, i.e., an increase in the Percent Transmittance (After) is obtained with higher temperatures and shorter contact time periods as well as with lower temperatures and longer contact time intervals. Also demonstrated is that an antireflective surface, as measured by an increase in percent transmittance, is obtained by treatment with an aqueous electrolyte over a wide range of temperature levels and time intervals.

EXAMPLE 14

The procedure of Example 13 was followed except that the temperature of the aqueous electrolyte treatment was maintained at about 100° C. and the composition of the aqueous electrolyte solution was varied as indicated in Table 3. The aqueous electrolyte solutions were prepared using water processed by reverse osmosis and to which individually was added the following chemicals: 0.01 weight percent of the indicated carbonate compound; an amount of metal hydroxide compound that resulted in a solution pH of 9 (or in the case of aluminum hydroxide was a saturated solution that was adjusted to a pH of 9 with ammonium hydroxide); and 0.01 weight percent of stannic chloride that was adjusted to a pH of 9 with ammonium hydroxide.

TABLE 3

| Electrolyte Solution Chemical | Percent Transmittance (Before) | Treatment Time (Minutes) | Percent Transmittance (After) |
| --- | --- | --- | --- |
| Magnesium Carbonate | 93.6 | 24 | 98.6 |
| Calcium Carbonate | 93.6 | 19 | 96.5 |
| Sodium Carbonate | 93.5 | 19 | 98.1 |
| Sodium Hydroxide | 93.6 | 55 | 96.8 |
| Magnesium Hydroxide | 93.5 | 19 | 98.0 |
| Aluminum Hydroxide | 93.6 | 40 | 94.4 |
| Stannic Chloride | 93.8 | 60 | 94.1 |

The results of Table 3 show that various inorganic electrolytes in aqueous solution can be used in the process of the present invention to treat substrates to which coating compositions of the present invention have been applied and cured. These treatments resulted in an improvement of the antireflective nature of the surface as demonstrated by an increase in the Percent Transmittance (After).

EXAMPLE 15

Variations of the coating composition of Step 2 of Example 1 were prepared as Coating Compositions C and D.

Coating Composition C differed from the coating composition of Example 1 by using the following components: gamma-glycidoxypropyl trimethoxysilane (4.5 grams), acetic acid (6.3 grams), ethanol (40 grams) and 3.3 grams of the polymer solution of Step 1. Coating Composition D differed from Coating Composition C by using 5 grams of the polymer solution of Step 1. Both coating compositions were applied to several test samples of the same type of square polymerizates described in Example 12, Part A, cured, and tested according to the procedures of Parts A and B of Example 12, except that the coating solution was aged for 7 days and a different aqueous electrolyte solution was used. The aqueous electrolyte solution was water prepared by reverse osmosis that had its pH adjusted by the addition of hydrochloric acid and/or sodium hydroxide to its pH levels listed in Table 4.

TABLE 4

| Coating Composition | pH Level | Percent Transmittance (Before) | Treatment Time (Minutes) | Percent Transmittance (After) |
|---|---|---|---|---|
| C | 1 | 93.5 | 300 | 93.2 |
| D | 1 | 93.4 | 300 | 93.0 |
| C | 2 | 93.6 | 240 | 93.4 |
| D | 2 | 93.7 | 240 | 93.4 |
| C | 3 | 93.5 | 180 | 93.2 |
| D | 3 | 93.6 | 180 | 93.3 |
| C | 4 | 93.4 | 95 | 96.5 |
| D | 4 | 93.6 | 55 | 96.7 |
| C | 5 | 93.4 | 100 | 93.6 |
| D | 5 | 93.4 | 60 | 94.8 |
| C | 6 | 93.4 | 140 | 93.6 |
| D | 6 | 93.6 | 140 | 96.0 |
| C | 7 | 93.4 | 85 | 93.8 |
| D | 7 | 93.5 | 75 | 96.6 |
| C | 8 | 93.4 | 90 | 97.2 |
| D | 8 | 93.6 | 45 | 96.1 |
| C | 9 | 93.4 | 110 | 96.7 |
| D | 9 | 93.4 | 65 | 96.7 |
| C | 10 | 93.5 | 50 | 96.3 |
| D | 10 | 93.4 | 30 | 95.8 |
| C | 11 | 93.3 | 13 | 98.0 |
| D | 11 | 93.4 | 10 | 97.6 |
| C | 12 | 93.5 | 11 | 96.1 |
| D | 12 | 93.4 | 11 | 96.2 |

The results of Table 4 demonstrate the effect of having different amounts of functionalized polymer in the coating composition on the treatment time required to attain the same percent transmittance. Generally, the time of treatment necessary to obtain a given transmittance was less for Coating Composition D (higher level of polymer) in the pH range between 4 and 11. At a pH above or below this range, the level of polymer did not have an observable effect on the treatment time. Also, when the pH was below 4, a decrease in the percent transmittance was observed.

EXAMPLE 16

Variations of the coating composition of Step 2 of Example 1 were prepared as Coating Compositions E-1 through E-7. After all of the components of the Coating Compositions listed in Table 5 were added to a reaction flask, the contents were stirred for from 60 to 80 minutes at room temperature. The pH of each coating composition was adjusted then to from 4.2 to 4.4 with the addition of a 25 weight percent aqueous solution of tetramethylammonium hydroxide. FLUORAD® FC-430 surfactant (0.1 gram) was added to each coating composition and the resulting solution was stirred overnight at room temperature. Each solution was filtered through a Whatman 934-AH filter prior to use as a coating composition.

The coating compositions were applied to several test samples of the same type of square polymerizates described in Example 12, Part A, cured, and tested according to the procedures of Part A and Part B of Example 12 except that the coating solution was aged for 1 day, the aqueous electrolyte solution was a saturated solution of magnesium carbonate, and the test samples to which the coating was applied were first treated by soaking in a 15 weight percent aqueous tetramethylammonium hydroxide solution for about 5 minutes at 55° to 60° C. The test results are listed in Table 6.

TABLE 5

| Components | Coating Compositions* | | | | | | |
|---|---|---|---|---|---|---|---|
| | E-1 | E-2 | E-3 | E-4 | E-5 | E-6 | E-7 |
| MTES | 54 | 54 | 54 | — | — | 54 | 54 |
| MTMS | — | — | — | 54 | 54 | — | — |
| GGPTMS | 10.8 | 13.2 | 12.1 | 10.8 | — | — | 10.8 |
| APTMS | — | — | — | — | — | 5 | 5 |
| TEOS | 18 | 30 | — | 18 | 18 | 18 | 18 |
| Nitric Acid | 0.2 | 0.2 | 0.2 | 0.2 | 3.0 | 3.0 | 3.0 |
| Water | 36 | 36 | 32 | 36 | 36 | 36 | 36 |
| Ethanol | 40 | 40 | 40 | 40 | 72 | 40 | 40 |

MTES = methyltriethoxysilane
MTMS = methyltrimethoxysilane
GGPTMS = gamma-glycidoxypropyl trimethoxysilane
APTMS = 3-aminopropyl trimethoxysilane
TEOS - tetramethylorthosilicate
*Amounts listed are in grams

TABLE 6

| Coating Composition | Percent Transmittance (Before) | Treatment Time (Minutes) | Percent Transmittance (After) |
|---|---|---|---|
| E-1 | 92.4 | 120 | 94.6 |
| E-2 | 91.6 | 120 | 94.5 |
| E-3 | 87.6 | 30 | 91.0 |
| E-4 | 93.6 | 120 | 94.1 |
| E-5 | 93.5 | 40 | 95.3 |
| E-6 | 93.5 | 20 | 96.2 |
| E-7 | 93.2 | 20 | 97.1 |

The results of Table 6 demonstrate that the process of the present invention can be used to produce coatings having a graded porosity, as measured by an increase in percent transmittance, after aqueous electrolyte treatment, of cured coating compositions substantially free of the functional-group containing organic polymers of the type used in the coating compositions of the present invention. Furthermore, the use of different silane monomers in the coating composition of Example 16 effected the treatment time required to obtain an antireflective coating. For example, the increase in percent transmittance for coating composition E-1, which contained MTES, was 2.2 percent, whereas the increase for coating composition E-4, containing MTMS, was 0.5 percent. Also, the use of APTMS with MTMS in composition E-5 resulted in an increase in the percent transmittance of 1.8 percent.

The present invention has been described with reference to specific details of particular embodiments thereof. It is not intended that such details be regarded as limitations upon the scope of the invention except insofar as and to the extent that they are included in the accompanying claims.

We claim:

1. A coating composition consisting essentially of the composition obtained by mixing (1) the acid catalyzed hydrolysis and condensation products of a water-silane monomer mixture, and (2) a film-forming amount of a solution of solution polymerized organic polymer having functional groups selected from the group consisting of amino, hydroxy and carboxy, hydroxy and amino, amino and carboxy, and amino, hydroxy and carboxy, said polymer being compatible with said silane monomer and the acid catalyzed condensation products of said silane monomer, said coating composition forming a coating that exhibits an increase in luminous transmittance after treatment with an aqueous electrolyte solution.

2. The coating composition of claim 1 wherein said organic polymer is prepared from monomers selected from the group consisting of hydroxy ($C_2$-$C_4$) alkyl acrylates, hydroxy ($C_2$-$C_4$)alkyl methacrylates, acrylic acid, methacrylic acid, carboxy ($C_1$-$C_4$) alkyl acrylates, carboxy ($C_1$-$C_4$) alkyl methacrylates, amino substituted phenyl acrylates, amino substituted phenyl methacrylates, amino substituted phenyl($C_1$-$C_9$)alkyl acrylates, amino substituted phenyl($C_1$-$C_9$)alkyl methacrylates, amino substituted phenoxy acrylates, amino substituted phenoxy methacrylates, amino substituted phenoxy($C_1$-$C_9$)alkyl acrylates, amino substituted phenoxy($C_1$-$C_9$)alkyl methacrylates, amino ($C_1$-$C_9$ alkyl acrylates, amino($C_1$-$C_9$)alkyl methacrylates, vinylamines and mixtures of said monomers.

3. The coating composition of claim 2 wherein said monomers are selected from the group consisting of hydroxy ($C_2$-$C_4$)alkyl methacrylates, acrylic acid, methacrylic acid, carboxy ($C_1$-$C_4$)alkyl acrylate, amino($C_1$-$C_9$)alkyl acrylates, amino ($C_1$-$C_9$)alkyl methacrylates, and mixtures of said monomers.

4. The coating composition of claim 1 wherein said polymer is prepared from said monomers and additional monomers substantially free of hydroxy, carboxy and amino functional groups.

5. The composition of claim 1 wherein the silane monomer is representable by the following general formula:

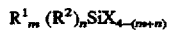

wherein $R^1$ is $C_1$-$C_{20}$ alkyl, $C_1$-$C_{20}$ haloalkyl, $C_2$-$C_{20}$ alkenyl, $C_2$-$C_{20}$ haloalkenyl, phenyl, phenyl($C_1$-$C_{20}$)alkyl, $C_1$-$C_{20}$ alkylphenyl, phenyl ($C_2$-$C_{20}$)alkenyl, $C_2$-$C_{20}$ alkenylphenyl, glycidoxy($C_1$-$C_{20}$)alkyl, epoxycyclohexyl ($C_1$-$C_{20}$)alkyl, morpholino, amino($C_1$-$C_{20}$)alkyl, amino ($C_2$-$C_{20}$)alkenyl, mercapto($C_1$-$C_{20}$)alkyl, mercapto ($C_2$-$C_{20}$)alkenyl, cyano($C_1$-$C_{20}$)alkyl, cyano($C_2$-$C_{20}$) alkenyl, acryloxy, methacryloxy, or halogen, $R^2$ is $C_1$-$C_{20}$ alkylene, $C_2$-$C_{20}$ alkenylene, phenylene, $C_1$-$C_{20}$ alkylenephenylene, amino($C_1$-$C_{20}$)alkylene, amino ($C_2$-$C_{20}$) alkenylene, X is hydrogen, halogen, hydroxy, $C_1$-$C_5$ alkoxy, $C_1$-$C_5$ alkoxy($C_1$-$C_5$)alkoxy, $C_1$-$C_4$ acyloxy, phenoxy, $C_1$-$C_3$ alkylphenoxy, or $C_1$-$C_3$ alkoxyphenoxy, said halo or halogen being bromo, chloro or fluoro, m and n are each an integer of from 0 to 2, and the sum of m and n is an integer of from 0 to 3.

6. The coating composition of claim 5 wherein:
(a) $R^1$ is a $C_1$-$C_{10}$ alkyl , $C_1$-$C_{10}$ (halo)alkyl, $C_2$-$C_{10}$ alkenyl, phenyl, phenyl ($C_1$-$C_{10}$)alkyl, $C_1$-$C_{10}$ alkylphenyl, glycidoxy($C_1$-$C_{10}$) alkyl, epoxycyclohexyl($C_1$-$C_{10}$)alkyl, morpholino, amino ($C_1$-$C_{10}$)alkyl, amino($C_2$-$C_{10}$)alkenyl, mercapto ($C_1$-$C_{10}$)alkyl; mercapto($C_2$-$C_{10}$)alkenyl, cyano ($C_1$-$C_{10}$)alkyl, cyano($C_2$-$C_{10}$)alkenyl, or halogen, $R^2$ is a $C_1$-$C_{10}$ alkylene or $C_2$-$C_{10}$ alkenylene group, phenylene, $C_1$-$C_{10}$ alkylenephenylene, amino($C_1$-$C_{10}$) alkylene, amino($C_2$-$C_{10}$)alkenylene, X is hydrogen, halogen, hydroxy, $C_1$-$C_3$ alkoxy, $C_1$-$C_3$ alkoxy ($C_1$-$C_3$)alkoxy, $C_1$-$C_2$ acyloxy, phenoxy, $C_1$-$C_2$ alkylphenoxy, or $C_1$-$C_2$ alkoxyphenoxy, said halo or halogen being chloro or fluoro; and (b) the water-soluble acid used to prepare the silane hydrolysis and condensation products is selected from the group consisting of acetic, formic, glutaric, maleic, nitric, sulfuric, and hydrochloric acid.

7. The coating composition of claim 1 further comprising components selected from the group consisting of:
(a) from about 0 to about 20 weight percent, based on the total weight of the coating composition, of a compound having the empirical formula $M(Y)_p$, wherein M is a metal selected from the group consisting of Ti, Al, Zr, B, Sn, In, Sb, and Zn, and Y is selected from the group consisting of $C_1$-$C_{10}$ alkoxy, acetylacetonato, and p is an integer equivalent to the valence of M;

(b) from about 0 to about 10 weight percent, based on the total weight of the coating composition, of a compound having the formula $F(CF_2)_gCH_2CH_2Si(CH_3)_hZ_{3-h}$, wherein Z is chloro, methoxy, or ethoxy, g is an integer of from 1 to 10, and h is an integer of from 0 to 2;

(c) a binding amount of organic polymer substantially free of the functional groups hydroxy, carboxy, and amino;

(d) a solvating amount of organic solvent; and (e) a leveling amount of surfactant.

8. The coating composition of claim 7 wherein:
(a) the amount of said compound (a) is from about 0 to 10 weight percent, M is selected from the group consisting of Ti, Al, B, and Zr, and Y is $C_1$-$C_5$ alkoxy;

(b) said organic polymer (c) is selected from the group consisting of polyacrylates, polymethacrylates, poly ($C_1$-$C_2$)alkyl methacrylates, poly($C_1$-$C_{12}$)alkyl acrylates, polyoxy(alkylene methacrylates), poly (alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyurethanes, poly(ethylene terephthalate), copoly(styrene-methylmethacrylate), copoly(styrene-acrylonitrile), poly(vinyl pyrrolidone), and polyvinylbutyral;

(c) said surfactant is a nonionic surfactant selected from the group consisting of $C_8$-$C_{13}$ alkyl phenol ethoxylates, fluoroaliphatic polymeric esters, and fluorinated alkyl polyoxyethylene ethanols; and (d) said organic solvent is selected from the group consisting of ethyl acetate, tetrahydrofuran, $C_1$-$C_6$ alkanol, and aliphatic alcohol of the empirical formula $[(R^3)_iR^4](C_1$-$C_6)OH$, wherein $R^3$ and $R^4$ are each $C_1$-$C_4$ alkoxy, and i is the integer 0 or 1.

9. An article comprising, in combination, a solid substrate and on at least one surface thereof the cured coating composition of claim 1.

10. The article of claim 9 wherein said substrate is selected from the group consisting of glass, ceramics, metals, and solid organic polymeric materials.

11. The article of claim 10 wherein said solid organic polymeric material is selected from the group consisting of polyacrylates, polymethacrylates, poly($C_1$-$C_{12}$) alkyl methacrylates, polyoxy(alkylene methacrylates), poly (alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyurethanes, poly(ethylene terephthalate), polystyrene, poly(alpha methylstyrene), copoly(styrene-methylmethacrylate), copoly(styrene-acrylonitrile), polyvinylbutyral and polymers of members of the group consisting of polyol(allyl carbonate) monomers, polyfunctional acrylate monomers, polyfunctional methacrylate monomers, diethylene glycol dimethacrylate monomers, diisopropenyl benzene monomers, alkoxylated polyhydric alcohol monomers and diallylidene pentaerythritol monomers.

12. The article of claim 11 wherein said solid organic polymeric material is a homopolymer or copolymer of monomer(s) selected from the group consisting of acrylates, methacrylates, methyl methacrylate, ethylene glycol bis methacrylate, ethoxylated bisphenol A dimethacrylate, vinyl acetate, vinyl butyral, urethane, diethylene glycol bis(allyl carbonate), diethylene glycol dimethacrylate, diisopropenyl benzene, and ethoxylated trimethylol propane triacrylate.

13. An article comprising, in combination, a solid substrate and on at least one surface thereof the cured coating composition of claim 4.

14. An article comprising, in combination, a substrate and on at least one surface thereof the cured coating composition of claim 6.

15. An article comprising, in combination, a substrate and on at least one surface thereof the cured coating composition of claim 8.

* * * * *